United States Patent [19]

Kowalski

[11] 3,921,660
[45] Nov. 25, 1975

[54] THREE-WAY, TWO-POSITION NON-INTERFLOW POPPET VALVE

[75] Inventor: Slawomir Kowalski, Rockaway, N.J.

[73] Assignee: Marotta Scientific Controls, Inc., Boonton, N.J.

[22] Filed: Aug. 15, 1974

[21] Appl. No.: 497,759

[52] U.S. Cl. ...... 137/236; 137/625.27; 137/625.64; 137/625.66; 166/.5; 251/131; 251/DIG. 1
[51] Int. Cl.² ..................................... F15B 13/043
[58] Field of Search............ 137/236, 596.17, 596.2, 137/625.12, 625.25, 625.26, 625.27, 625.6, 625.64, 625.66, 625.68; 166/.5; 251/DIG. 1, 210, 131

[56] References Cited
UNITED STATES PATENTS

| | | | |
|---|---|---|---|
| 1,075,068 | 10/1913 | Shell | 137/625.12 |
| 1,167,027 | 1/1916 | Stephenson | 137/625.26 |
| 1,492,980 | 5/1924 | Hodges | 137/625.12 |
| 2,716,425 | 8/1955 | Yarber | 137/625.64 |
| 3,126,915 | 3/1964 | Hunt | 137/625.27 UX |
| 3,198,481 | 8/1965 | Bryant | 251/210 |
| 3,443,594 | 5/1969 | Frayer | 137/625.64 |
| 3,460,614 | 8/1969 | Burgess | 137/596.18 X |
| 3,613,070 | 10/1971 | Jones et al. | 251/131 X |
| 3,618,690 | 11/1971 | Johnson | 251/DIG. 1 X |
| 3,805,837 | 4/1974 | Stampfli | 137/625.6 |

FOREIGN PATENTS OR APPLICATIONS

| | | | |
|---|---|---|---|
| 586,960 | 12/1958 | Italy | 137/625.25 |
| 590,052 | 3/1959 | Italy | 137/625.26 |

*Primary Examiner*—Alan Cohan
*Assistant Examiner*—Gerald A. Michalsky
*Attorney, Agent, or Firm*—Sandoe, Hopgood & Calimafde

[57] ABSTRACT

This invention is a three-way, two-position poppet valve that opens a pressure port when at one end of the valve stroke, and an exhaust passage when at the other end of the valve stroke. In order to prevent interflow between the pressure and exhaust passages, when the poppet valve is at intermediate positions between the ends of its stroke, there are parts of the poppet valve that function like a sleeve valve for preventing such interflow. The valve is preferably pilot operated and the preferred embodiment is internally piloted to make the valve more compact and suitable for use in a bore of a control system for well heads of undersea oil wells. The pilot valve can be operated by hydraulic or electric power to make the high pressure fluid that the valve controls supply the power to operate the main valve element.

16 Claims, 5 Drawing Figures

THREE-WAY, TWO-POSITION NON-INTERFLOW POPPET VALVE

BACKGROUND AND SUMMARY OF THE INVENTION

The valve of this invention is a three-way, two-position poppet valve. In one position it supplies high presure working fluid to a cylinder or other load; and in a second position it connects the cylinder with an exhaust outlet. The valve is suitable for use with undersea oil drilling equipment and is constructed for use with pressures from 500 to 5000 pounds per square inch. In order to conserve high pressure working fluid, the valve is equipped with means for preventing any direct interconnecting of the pressure supply with the exhaust outlet when the valve element is moving from one end of its stroke to the other.

Interflow between the pressure port and the exhaust port is prevented by having end portions of the poppet valve element operate in close fitting guides that provide a sleeve valve effect during most of the stroke of the poppet valve element.

The poppet valve is piloted and the preferred combination is internally piloted for compact construction and to keep the entire valve structure within an elongated cylindrical configuration that fits into bores of a conventional control pod used at undersea well heads.

The valve of this invention can be controlled by hydraulic pressure or by electric power; and the latter has an advantage for undersea work because wires can be used instead of hoses and some controls are operated by sonic signals transmitted through the water.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
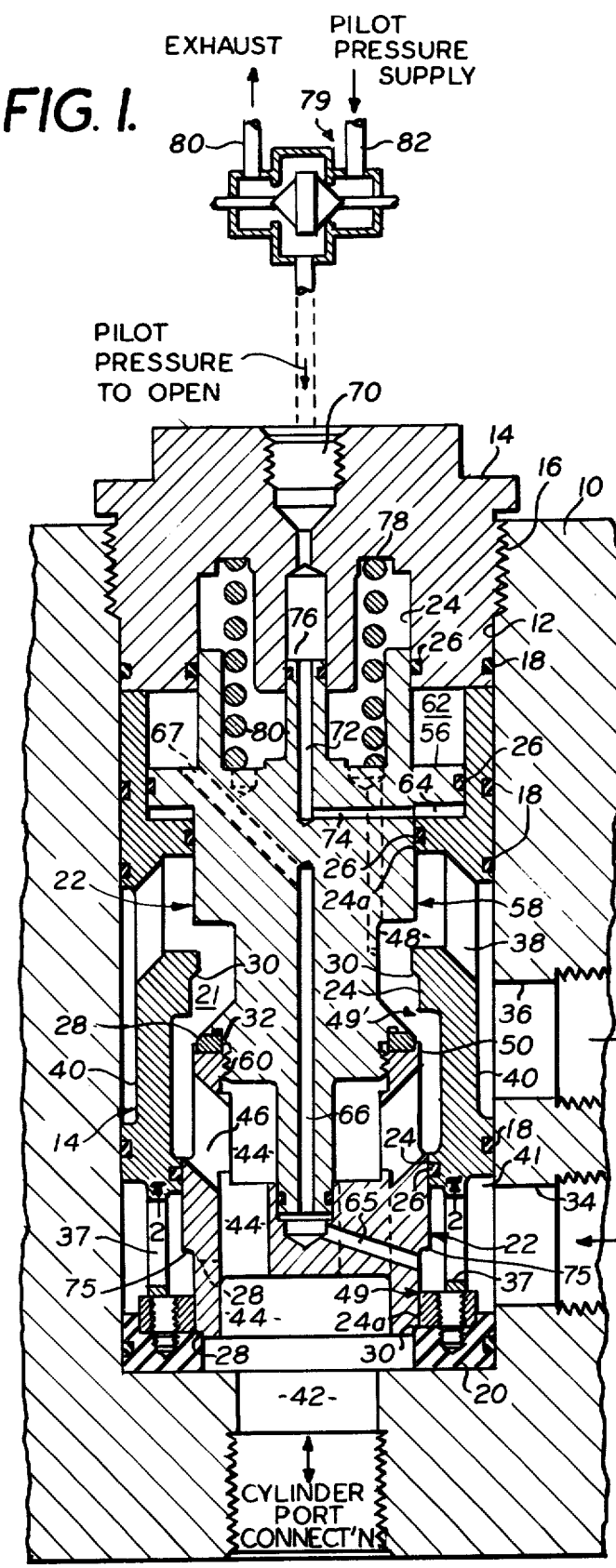
FIG. 1 is a sectional view showing a valve made in accordance with this invention, the section being taken on the line 1—1 of FIG. 2.

FIG. 1 shows a portion of a pod 10 which is part of a stationary housing connected with the well head of an underwater oil or gas well. The pod 10 has a cylindrical recess 12 into which a valve housing 14 fits. The valve housing 14 fits snugly within the recess 12 and is preferably secured to the recess by threads 16 at the upper end of the recess. There are sealing rings 18, such as O-rings, at spaced locations along the length of the recess 12. In the construction illustrated these sealing rings 18 are located in cylinderical recesses in the outside circumference of the valve housing 14.

At the lower end of the housing 14 there is an annular ring 20 made of plastic and secured to and forming a part of the housing 14. This ring 20 and its sealing ring 18 provide a seal for the housing 14 at the lower end of the recess 12.

Within the housing 14 there is a valve element 22 which has cylindrical circumferential portions which fit through bearings or guides 24 of the valve housing. The valve element 22 fits with a running fit in the guides 24 and there are seals, comprising O-rings 26 at various locations along the length of the valve element 22 for preventing any flow of fluid through the clearances between the valve element 22 and the guides 24 at locations where such clearances would permit direct leakage of high pressure fluid into the passages for exhaust fluid, as will be explained herein.

The valve element 22 has end faces 28 which contact with complementary faces 30. For purposes of this description, the faces 28 on the valve element will be referred to as the valve faces and the complementary faces 30 on the stationary housing 14 will be referred as "seats." If the seat is more properly the portion that is made of softer material for sealing against leakage between the valve element and the housing, then it will be apparent from FIG. 1 that the softer face can be on either the valve element or the housing. For example, the ring 20 at the lower end of the housing 24 constitutes the sealing surface between the faces 28 and 30 at the lower end of the valve element 22. On the other hand a plastic insert 32 constitutes the element for sealing against leakage between the end faces 28 and 30 at the upper part of the valve element.

There is a pressure supply port 34 opening through the wall of the recess 12. At a somewhat higher level, the pod 10 has an exhaust port 36 opening through the side wall of the recess 12. An opening 37 in the valve housing 14 communicates with the port 34 of the pod. An opening 38 in the valve housing 14 communicates with the exhaust port 36. There are preferably several angularly spaced openings 37 and 38 around the circumference of the housing 14 and these openings lead into cylindrical grooves 40 and 41 for insuring adequate cross section of communication between the openings 37 and 38 when the housing 14 is screwed into the recess 12 and regardless of the angular positions of the openings 37 and 38 with respect to the ports 34 and 36. The groove 40 is also of sufficient longitudinal extent so that the axial spacing of the openings 37 and 38 need not correspond with that of the ports 34 and 36.

At the lower end of the recess 12, there is a port or passage 42 communicating with a cylinder for which the valve element 22 serves as a pressure supply valve and also as an exhaust valve.

When the valve element 22 is in the position shown in FIG. 1, pressure from the cylinder passes upward through the passage 42 and into a hollow interior chamber 44 of the valve element 22. Angularly spaced passages 46 lead from the hollow interior chamber 44 through the sides of the valve element 22, and open into a clearance 48 between the valve element 22 and the wall of the housing 14. From this clearance, the fluid exhausts through the opening 38, circumferential groove 40 and into the exhaust port 36.

When the valve element 22 moves from the lower end of its stroke, shown in FIG. 1, upwardly until the upper face 28 is in contact with the seat 30, flow of exhaust fluid is shut off. This upper movement of the valve element 22 opens a clearance between the lower face 28 of the valve element and the seat 30. The position of the face 28, when the valve element 22 is at the upper end of its stroke, is indicated by dotted lines in FIG. 1. This permits pressure from the port 34 to flow through the groove 41, opening 36 and past the lower end of the valve element 22 to the passage 42 leading to the cylinder for which the pressure fluid is supplied.

It is a feature of the invention that the first part of the upward movement of the valve element 22 does not put the port 34 into communication with the passage 42. The lower end of the valve element slides in the guide 24 provided by the lower part of the valve housing just above the ring 20. The lower end of the valve element must reach a level approximately equal to that indicated by the arrow 49 before any communication is established between the supply port 34 and the cylinder connection port 42.

Although the valve element 22 is a poppet valve at its end portions which contact with seats of the valve housing, it will be apparent that the lower end of the valve element 22 also operates in the nature of a sleeve valve while it is moving from the lower end of its stroke, shown in FIG. 1, to the level indicated by the arrow 49'.

In similar manner the valve element 22 cuts off communication between the cylinder connection 42 and the exhaust port 36 long before the end face 28 of the valve element contacts with the seat 30 of the valve housing. As soon as the upper end face 28 of the valve element reaches the approximate level indicated by the arrow 49', a circumferential surface 50 of the valve element enters into the guide 24 located just below the seat 30. There is only running clearance between the circumferential surface 50 and the guide surface 24 so that there can be no substantial flow of exhaust fluid after the surface 50 enters into the guide 24. Thus the upper end of the valve element also serves as a sleeve valve during a part of its stroke.

The effect of this sleeve valve action at both ends of the stroke of the valve element 22 has the effect of preventing the pressure supply port 34 from ever being in communication with the exhaust port 36 at any time during the movement of the valve element from its supply position to its exhaust position. For a brief moment during its travel, the valve element 22 shuts off the communication of both the pressure supply port 34 and the exhaust port 36 from the cylinder port connecting passage 42. This prevents the loss of high pressure fluid to the exhaust port during the movement of the valve from supply position to exhaust position.

The guide surfaces of the valve housing 14 include the guide 24 cylinder 24. An annular piston 56 fits into the cylinder 24 and has a piston ring which comprises one of the sealing rings 26. This annular piston 56 is a flange on an upper part 58 of the valve element 22. The upper part 58 is connected with the lower part of the valve element by threads 60.

The piston 56 divides the cylinder 24 into an upper chamber 62 and a lower chamber 64. There are passages 65, 66 and 67 in the valve element 22 which put the upper chamber 62 in communication with the pressure supply port 34 at all times, regardless of the position of the valve element 22.

Pilot pressure for operating the valve element 22 is supplied through a passage 70 in the upper end of the valve housing 14. This passage 70 communicates with a longitudinal passage 72 in the upper part of the valve element 22; and the passage 72 leads downward to a radial passage 74 which opens into the lower chamber 64 of the cylinder 54.

The valve element 22 is urged downward by pressure of the pilot fluid against an annular area 76 at the top of the valve element, by a spring 78 compressed in a chamber 80 and by the pressure in the upper chamber 62 of the cylinder 24.

In order to move the valve element 22 from its lowered position to its upper position, it is necessary to supply power fluid under pressure to the lower chamber 64 of the cylinder 54. This pressure must be sufficient to develop a force against the piston 56 greater than the combined forces against the annular surface 76, the force of the spring 78 and the force of the fluid pressure against the upper surface of the piston 56.

To assist upward movement of the valve element, there is an overbalancing area 75 near the lower end of the valve element 22. This area 75 is an area exposed to pressure from the pressure port for all positions of the valve element, said area facing in a direction to counterbalance the force on the first chamber side of the annular piston, and spring compressed between the valve element and a part of the housing for urging the valve element in a direction to expand the length of the first chamber.

A pilot valve 79 supplies the pressure to the passage 70 from a high pressure fluid source 80 when the pilot valve is in the position shown in FIG. 1. Movement of the pilot valve 78 to the other end (left hand) puts an exhaust outlet 82 in communication with the passage 70 so that fluid pressure escapes from the lower chamber 64 of the cylinder 54 and this permits the valve element 22 to move downwardly to the lower end of its stroke. The pilot valve 78 is shown diagrammatically and is merely representative of control means for selectively putting the passage 70 in communication with a source of pressure and with an exhaust outlet.

Figure 2:
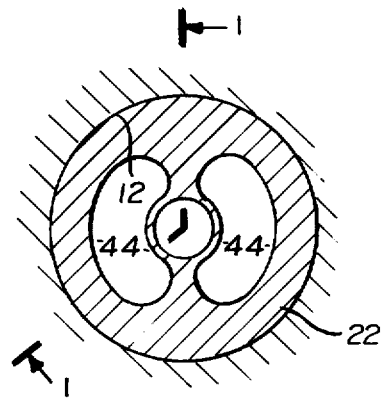
FIG. 2 is a sectional view taken on the line 2—2 of FIG. 1.
Figure 5:
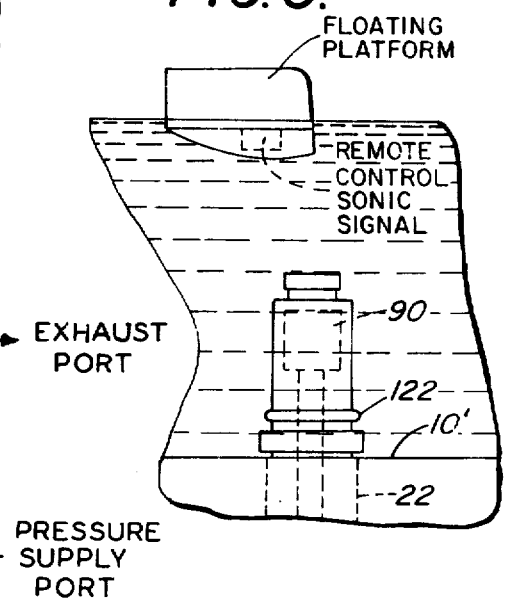
FIG. 5 is a diagrammatic view showing the remote control of the valve of this invention from a floating platform or ship.

FIG. 2 is a sectional view taken on the line 2—2 of FIG. 1 and shows the lower end of the valve element 22 with the passages 44 leading upwardly into the interior of the valve element.

Figure 3:
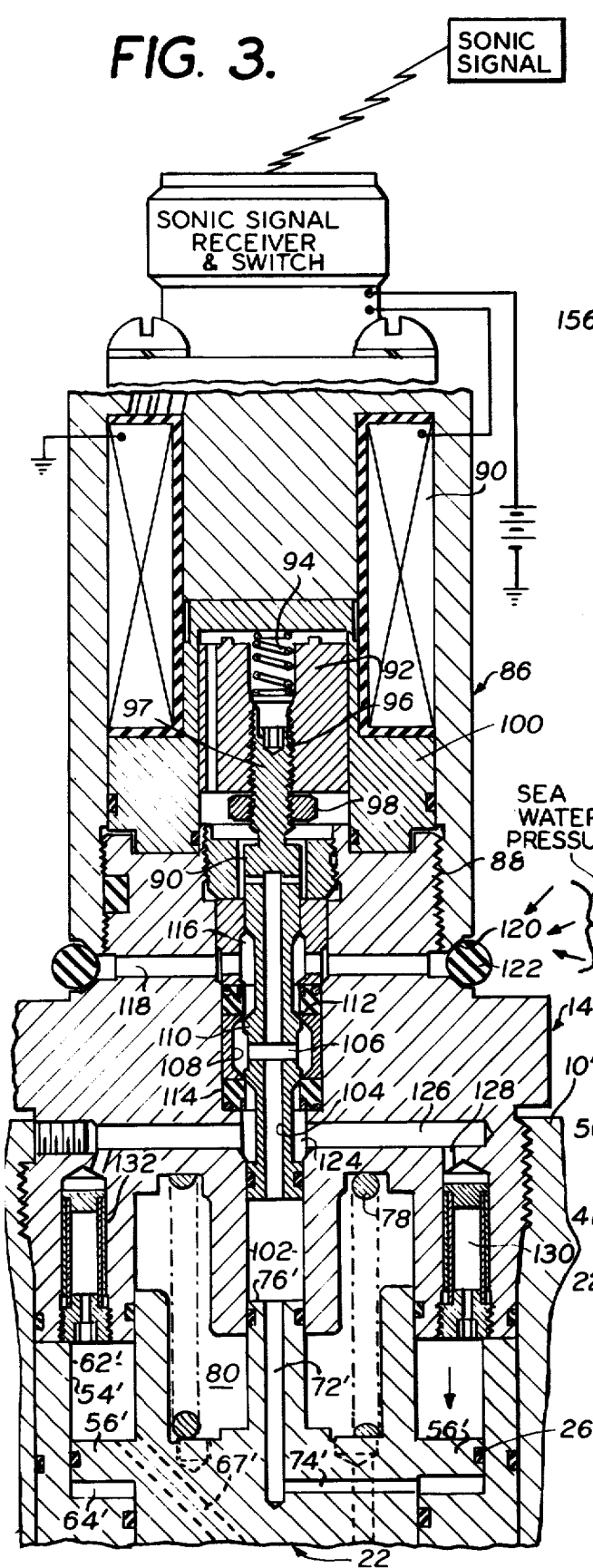
FIG. 3 is a view similar to FIG. 1 but showing a pilot vlave for controlling the operation of the main valve.

FIG. 3 illustrates a modification of the structure shown in FIG. 1 in that the pilot control is different from that of FIG. 1. The construction below the cylinder 54 of FIG. 1 is the same for the valve structure shown in FIG. 3 and therefore this part of the structure has not been illustrated. Parts in FIG. 3 which correspond to those shown in FIG. 1 are indicated by the same reference character with a prime appended. In FIG. 1 the pilot valve controlled a supply of working fluid for operating the piston 56 to open and close the valve element. In FIG. 3 there is no separate supply for working fluid to operate the piston 56'. The same high pressure fluid that is supplied to the cylinder controlled by the main valve element is also used to move the valve in both directions and an electrically operated valve controls the flow of this high pressure fluid.

There is a solenoid housing attached to the upper end of the valve housing 14' by screw threads 88.

A solenoid coil 90 moves an armature 92 upward when the solenoid coil 90 is energized. A spring 94 pushes the armature 92 downward again when the supply of power to the coil 90 is shut off. The armature 92 is adjustable along screw threads 96 on a shaft 97, and is held in adjusted position by a lock nut 98. This shaft 97 moves up and down as a unit with the armature 92 and slides in a wide bushing 100 and in the upper end of a cylinder guide chamber 102.

There is a passage 104 extending longitudinally through the shaft 97 for most of the length of the shaft. This passage 104 communcates with the cylindrical guide chamber 102 which in turn communicates with the passages 72' and 74' leading to the lower chamber 64' under the piston 56'.

The passage 104 has branches 106 leading to a pilot valve chamber 108. A pilot valve 110 is formed on the shaft 90 with tapered faces that seat against plastic seats 112 and 114 at the upper and lower, respectively, end of the valve chamber 108.

The pilot valve 110 is shown in FIG. 3 in contact with the lower seat 114 and spaced from the upper seat 112.

When the coil 90 is energized and moves the armature 92 upwardly, the pilot valve 110 is moved into contact with the seat 112 to close the upper end of the chamber 108 and the pilot valve opens up a clearance between its lower face and the seat 114.

The upper end of the chamber 108 communicates through an annular space between the shaft 97 and the seat 112 with an annular space 116 from which angularly spaced passages 118 lead to an annular groove 120 in which there is an elastic O-ring 122. This O-ring acts as a check valve to prevent sea water that surrounds the housing 86 from entering the passages 118; but the ring 122 stretches to permit fluid under pressure to escape through the passages 118 into the sea water surrounding the housing 86. The housing 86 is in contact with the sea water because it is above the level of the pod 10' into which the housing 14' is screwed.

The chamber 108 communicates at its lower end with an annular chamber 124 which has angularly spaced passages 126 leading radially outward to longitudinal passages 128 which communicate with chambers 130 located above the cylinder 54'.

In the illustrated construction there are filters 132 located in the chambers 130. These chambers 130 communcate through the upper end of the cylinder 54' with the upper chamber 62'.

With the pilot valve 110 closed against the bottom seat 114, high pressure from the passage 67' can reach the annular space 124 but cannot enter the pilot valve chamber 108.

The lower chamber 64' under the piston 56' is in communication through the passages 74', 72', chamber 102, passage 104, branch passages 106 and annular chamber 116 with the passages 118 through which fluid can escape past the rings 122 into the surrounding sea water. Thus the pressure in the lower chamber 64' of the valve operating piston 56' can exhaust down to a pressure slightly greater than the sea water pressure.

This reduction in pressure under the piston 56', with the pressure above the piston equal to the high pressure fluid at the valve controls, causes the piston 56' to move the valve element downwardly to close the main valve against its lower seat as explained in connection with the operation described for FIG. 1.

When the main valve is to be moved to the upward end of its stroke, the solenoid 90 is energized to move the armature 92 upward so that the pilot valve 110 closes against the seat 112. This opens clearance between the pilot valve and the seat 114 so that high pressure fluid from the passages 126 can flow into the pilot valve chamber 108 and through the branch passages 106 which communicate with the chamber 64' under the piston 56' as already described. The branch passages 106 also communicate with spaces above them and around the upper end of the shaft 97 and the armature 92; but the communication with these passages is merely for counterbalancing effects.

When both the upper and lower surfaces of the piston 56' are exposed to the high pressure, the piston 56' moves upward because of the back pressure from the cylinder which the main valve controls and because of areas of the main valve which are exposed to upward pressure of the high pressure fluid.

Figure 4:
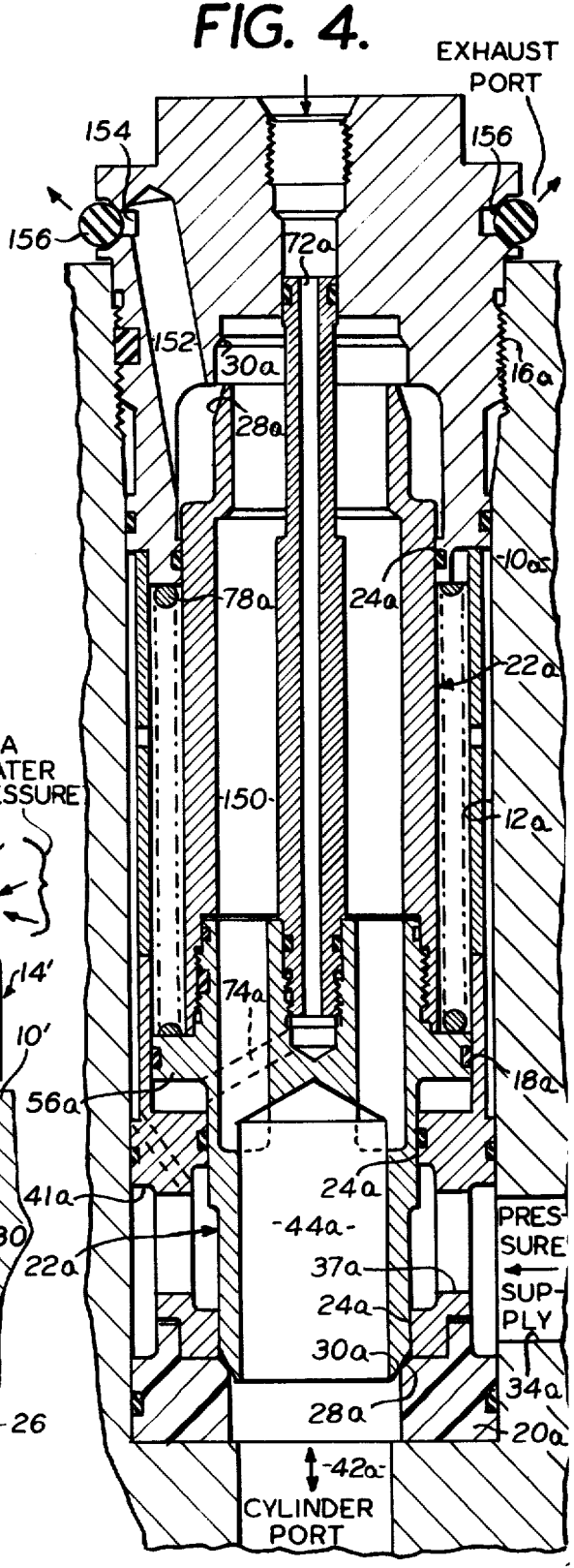
FIG. 4 shows a modified construction which has different means for conveying the pilot valve pressure and which has the main exhaust through O-ring check valves.

FIG. 4 shows another modified construction in which the exhaust of working fluid from the cylinder, which is controlled by the main valve, is not carried through a passage in the pod but is discharged into the sea water above the pod in the same way as the pilot valve fluid is discharged in the construction shown in FIG. 3. Parts in FIG. 4 that correspond with parts in FIG. 1 are indicated by the same reference character with a letter $a$ appended. There is considerable difference in the shape of the some of the parts in FIG. 4 as compared with FIG. 1 but they are indicated by the same reference characters where their function is the same and the construction similar.

A main valve element 22a has faces 28a at its opposite ends which contact with seats 30a and with the valve element 22a operating in the nature of a sleeve valve during portions of its stroke as previously described in connection with FIG. 1.

A passage 150 leads from the chamber 44a to the extreme upper end of the valve element 22a. When the valve element 22a is at the upper end of its stroke, the passage 150 communicates with a dead end of the housing.

When the valve element 22a is in open position, as shown in FIG. 4, exhaust fluid flowing upwardly through the chamber 44a and passage 150 flows into an exhaust passage 152 leading to a chamber 154 which is an annular groove in the upper end of the valve housing above the top of the pod 10a. This chamber 154 is an annular groove in the circumferential surface of the valve housing and it is closed against inflow of water by an elastic ring 156. There are preferably a number of anularly spaced passages 152 leading from the interior of the valve housing to the annular chamber 154.

As long as the pressure in the annular chamber 154 is not substantially higher than the sea water pressure, the ring 156 prevents communciation between the chamber 154 and the surrounding sea water because of the elasticity of the ring 156 which normally fits with a snug fit against the open end of the annular chamber 154.

Increase in pressure of the exhaust from the passage 152 stretches the ring 156 and permits the escape of fluid from the cylinder, which is controlled by the main valve, and the communicating passages 44a and 150.

The valve element 22a is urged downward by a spring 78a. When the valve element 22a is to be moved toward the upper end of its stroke fluid is supplied from a pilot valve through the passage 72a, radial passage 74a and into the space under the piston 56a. This pressure forces the valve element 22 upward against the pressure of the spring 78a and causes the valve element 22 to open a clearance between its lower end and the seat 30a so that high pressure fluid from the pod port 34a can flow under the lower end of the valve element 22a and into the cylinder port connection 42a, as already described in connection with the operation of the valve illustrated in FIG. 1.

The preferred embodiments of this invention have been illustrated and described, but changes and modifications can be made, and some features can be used in different combinations without departing from the invention as defined in the claims.

What is claimed is:

1. A three-way, two-position poppet valve assembly including in combination a main valve element, a housing in which the valve element is enclosed, the housing including a valve chamber, bearings in the housing axially spaced from one another and in which the valve element has sliding axial movement through a stroke, means for supplying working fluid to and from a cylinder including a port opening into the housing, other means for supplying working fluid to the valve housing including a second port opening into the housing, means for exhausting working fluid from the cylinder at the full pressure of the working fluid supply, including a third port opening into the housing, means for moving the valve element through its stroke, valve seats in the housing at opposite ends of the valve chamber, the valve element being within both of said bearings during its entire stroke, and one of said bearings being located axially between the valve seats, poppet valve faces on the valve element in position to contact with the seats to close off communication to and from the chamber, at opposite ends of the valve stroke with the second and third ports respectively, generally cylindrical surfaces of the valve element adjacent to and extending back from each poppet value face in the direction of the poppet valve face at the opposite end of the valve element, generally cylindrical guide surfaces of the housing and in which the generally cylindrical surfaces of the valve element slide with close clearance to prevent any substantial flow of fluid along the side of the valve element while the cylindrical surfaces of the valve element are moving in the cylindrical guide surfaces of the housing, the length of the cylindrical guide surfaces adjacent to each of the poppet valve faces being shorter than the stroke of the valve element so that each poppet valve face that is moving toward open position moves beyond and clear of the generally cylindrical guide surface, at the same end of the housing, before the valve element reaches its open position at either end of its stroke.

2. The valve assembly described in claim 1 characterized by seals at both of said bearings for preventing fluid flow axially between the bearings and valve element, the first port being at one end of the valve housing and the valve housing having the second and third ports opening through a side wall of the housing at different distances from said end of the valve housing, one of the side wall ports communicating, through the interior of the valve element, with the first port when the valve element is at one end of its stroke.

3. The valve assembly described in claim 2 characterized by the valve seat at one end of the valve element being between the first port and one of the side ports, and the valve seat at the other end of the valve element being located axially of the housing between the side ports, a flange extending radially from the valve element and forming an annular piston, and a generally cylindrical portion of the housing in which said flange moves as a piston with a first chamber on one side and a second chamber on the other side thereof, a pressure sealing ring between opposite sides of the annular piston, passages connecting the second port, that is a pressure port at all times, with said first chamber to move the valve element in one direction, and means for controlling flow of the pressure fluid to said second chamber, and an overbalancing area of the valve element on the second chamber side of the annular piston to move the valve element in the other direction.

4. The valve assembly described in claim 3 characterized by the valve element having an area exposed to pressure from the pressure port for all positions of the valve element, said area facing in a direction to counterbalance the force on the first chamber side of the annular piston, a spring compressed between the valve element and a part of the housing for urging the valve element in a direction to expand the length of the first chamber, the area of the annular piston which is exposed to the pressure in the second chamber being sufficient, when the pressure in both chambers is equal, to overbalance both the force in the first chamber and the force of the spring, and to move the valve element in a direction to expand the length of the second chamber.

5. The valve assembly described in claim 4 characterized by the spring holding the valve element in position to shut off the cylinder from the pressure port when there is no pressure in said pressure port, and the fluid from the pressure port being open at all times to the first chamber for holding the valve element in tis exhaust position when there is pressure in the first chamber and no overbalancing pressure in the second chamber.

6. The valve assembly described in claim 1 characterized by a spring in the valve housing urging the valve element in a direction to close one of the poppet valve faces against its seat, a second chamber in the valve housing, a movable wall of the second chamber connected with the valve element for movement as a unit therewith, and a pilot valve movable into one position for admitting fluid under pressure into said chamber to move the valve element against the force of the spring, and movable into a second position to exhaust fluid from said second chamber.

7. The valve assembly described in claim 1 characterized by the valve housing being of circular cross section for most of its length and the valve element having a passage therethrough, a pod for holding control apparatus, said pod having a recess with a cylindrical wall, ports opening through such cylindrical wall from the pod in position to communicate with the passages in the valve element and value housing when the valve housing is located in said recess, sealing elements between sides of the valve housing and the cylindrical wall of the pod recess at spaced locations along the cylindrical wall of the recess, and fastening means for holding the valve housing in the recess.

8. The valve assembly described in claim 7 characterized by a pilot valve for supplying fluid under pressure to operate said valve element, the pilot valve being located in the valve housing and within the projected limits of the cylindrical recess of the pod.

9. The valve assembly described in claim 1 characterized by a pressure chamber in the housing including a movable wall that is a part of the main valve element and that extends radially of the axis of movement of the main valve element, a pilot valve that supplies fluid under pressure to said chamber to operate the valve element in one direction, and operator-controlled means for actuating the pilot valve.

10. The valve assembly described in claim 9 characterized by an actuator for the pilot valve located in the housing with the pilot valve and the main valve element, the housing being sealed for sub-sea operation, and remote control means for operating the actuator from a station above the surface of the sea.

11. The valve assembly described in claim 10 characterized by the pilot valve actuator being electromagnetic and having a coil for energizing the actuator, a remote control switch, wires extending to the station above the surface of the sea, said wires connecting the coil with said remote control switch.

12. The valve asssembly described in claim 10 characterized by the pilot valve actuator being responsive to electric current, and a control switch for supplying electric current to the pilot valve actuator, said control switch including a receiver for sonic signals transmitted through the sea water from the remote control means above the surface of the sea.

13. The valve assembly described in claim 1 characterized by the housing having two pressure chambers, each of which has a part of the valve element as a movable wall thereof and against which pressure is exerted to move the valve element in opposite directions, ports through which working fluid is supplied to and from said chambers, said ports being the ends of passages extending through the valve element.

14. The valve assembly described in claim 13 characterized by a pilot valve for supplying pressure to operate the main valve element, the pilot valve being a two-position poppet valve with seats at both ends, a first passage extending through the pilot valve lengthwise thereof, and a second passage opening through a side of the pilot valve and into the first passage, these passages in the pilot valve being the only passages of the pilot valve between the seats thereof, the pilot valve when at one end of its stroke supplying fluid under pressure to operate the main valve element and at the other end of its stroke providing an exhaust outlet for the pressure that operates the main valve element.

15. The valve assembly described in claim 14 characterized by the exhaust outlet including a passage leading through a wall of the valve housing and communicating with a groove extending around a generally circular outside surface of the valve housing, and an elastomeric ring that fits into said groove to prevent water from entering the housing where the passage opens into said groove, the ring being stretched by exhaust fluid from said passage to discharge the exhaust fluid past said ring, but the ring serving as a check valve to prevent back flow of fluid into the housing through said passage.

16. The valve assembly described in claim 13 characterized by a pilot valve for controlling flow into and out of one of said chambers, the main valve element having a passage therethrough leading from the port that communicates with one of said chambers to another port that opens through and end face of the main valve element, the pilot valve having an end face that confonts the end face of the main valve element across a cylindrical space in which a part of the main valve element and a part of the pilot valve element move as pistons, and a passage through the pilot valve and opening through said end face of the pilot valve for supplying pressure fluid through said cylindrical space to the passage in the main valve element that leads to the port of the main valve element that communicates with one of said chambers.

* * * * *